Figure 1:
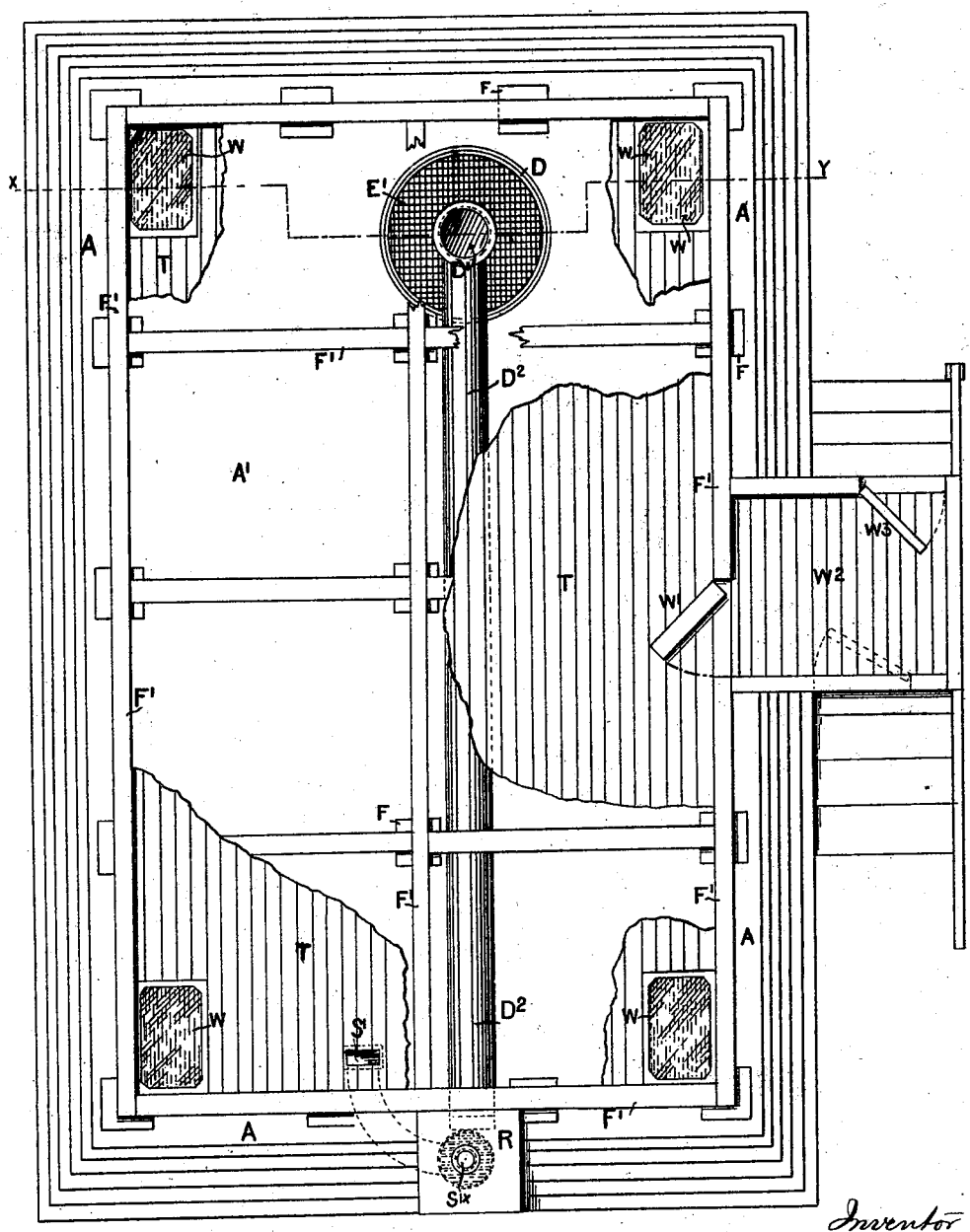

(No Model.) 7 Sheets—Sheet 2.
W. VAN DER HEYDEN.
SANITARY HOUSE.

No. 504,544. Patented Sept. 5, 1893.

(No Model.) 7 Sheets—Sheet 3.
W. VAN DER HEYDEN.
SANITARY HOUSE.

No. 504,544. Patented Sept. 5, 1893.

Witnesses
Chas. H. Smith
J. Staib

Inventor
W. van der Heyden
per Lemuel W. Serrell
Atty.

(No Model.)  W. VAN DER HEYDEN.  7 Sheets—Sheet 4.
SANITARY HOUSE.

No. 504,544. Patented Sept. 5, 1893.

Witnesses
Chas H Smith
J. Stait

Inventor
W. van der Heyden
per Lemuel W. Serrell
Atty (No Model.) 7 Sheets—Sheet 5.
W. VAN DER HEYDEN.
SANITARY HOUSE.
No. 504,544. Patented Sept. 5, 1893.
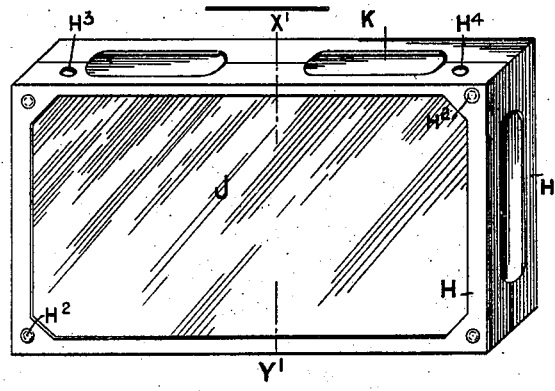
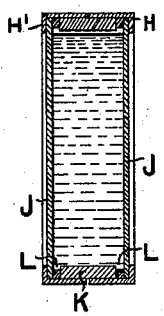
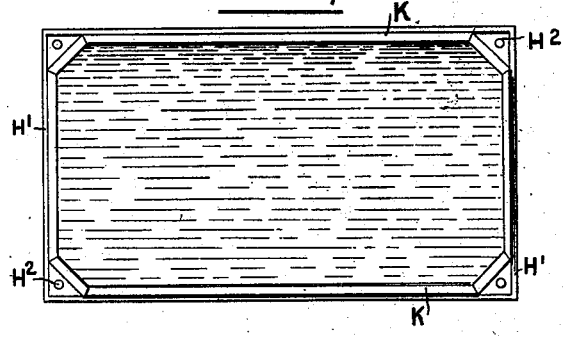
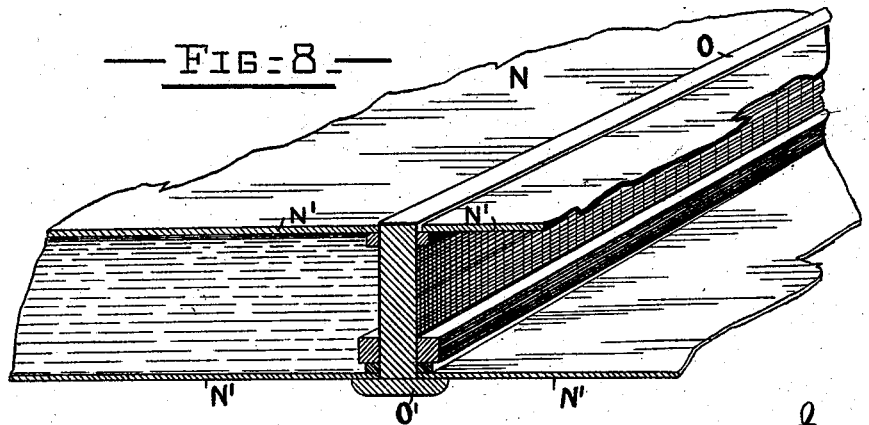
Witnesses
Chas. H. Smith
J. Staib
Inventor
W. van der Heyden
per Lemuel W. Serrell
Atty.

(No Model.) 7 Sheets—Sheet 6.
W. VAN DER HEYDEN.
SANITARY HOUSE.
No. 504,544. Patented Sept. 5, 1893.
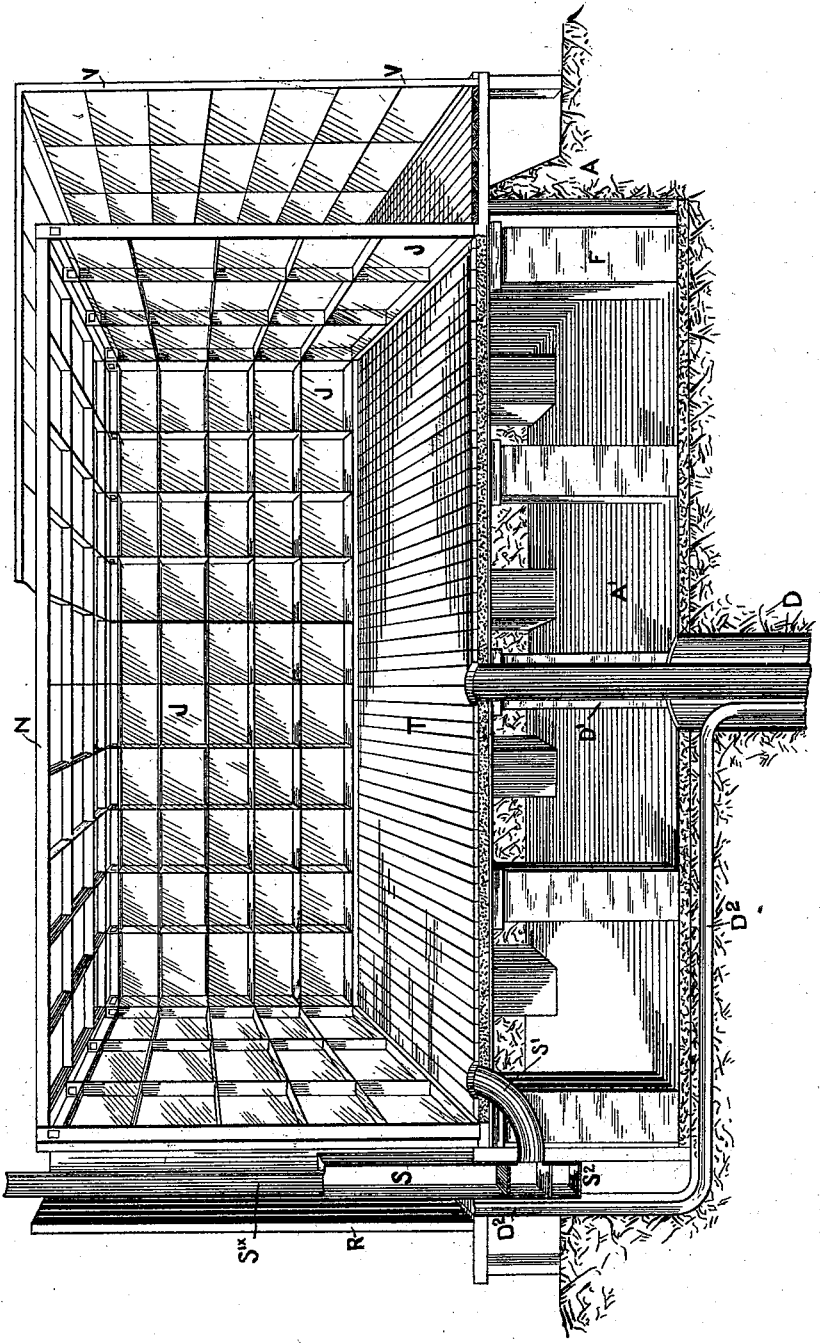
Witnesses
Chas H. Smith
J. Staib
Inventor
W. van der Heyden
per Lemuel W. Serrell
Atty (No Model.)
W. VAN DER HEYDEN.
SANITARY HOUSE.
No. 504,544.  Patented Sept. 5, 1893.
7 Sheets—Sheet 7.
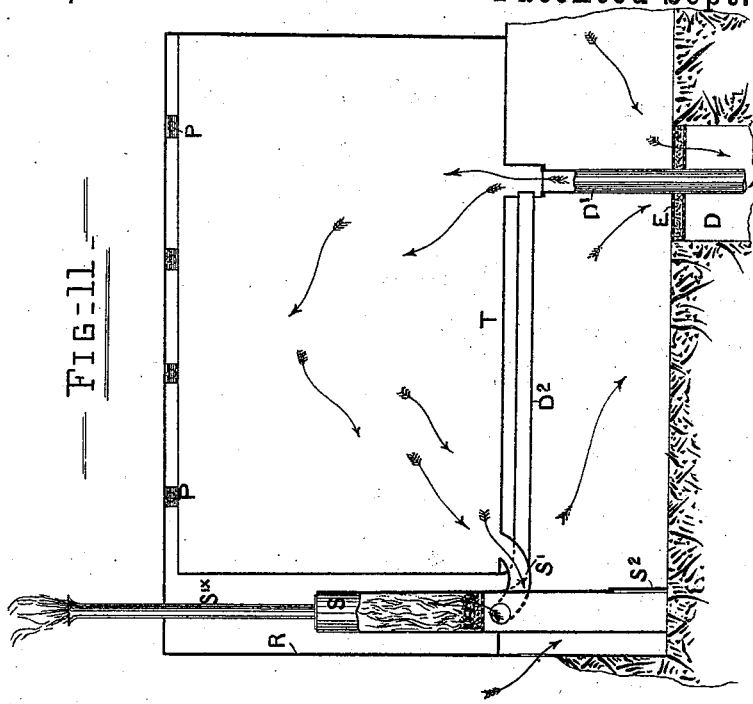
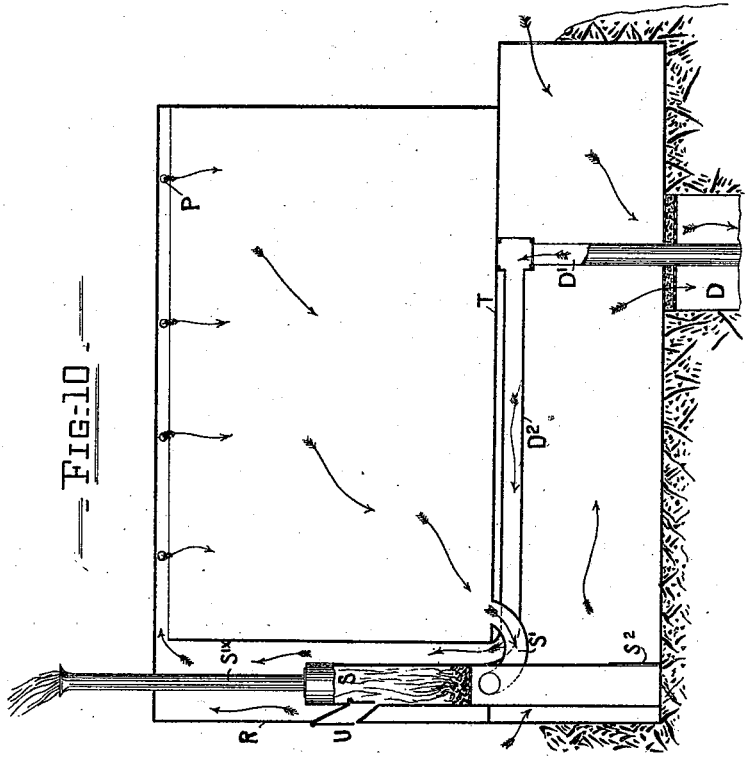

UNITED STATES PATENT OFFICE.

WILLIAM VAN DER HEYDEN, OF YOKOHAMA, JAPAN.

SANITARY HOUSE.

SPECIFICATION forming part of Letters Patent No. 504,544, dated September 5, 1893.

Application filed December 12, 1892. Serial No. 454,877. (No model.) Patented in England September 10, 1891, No. 15,347.

*To all whom it may concern:*

Be it known that I, WILLIAM VAN DER HEYDEN, a subject of the King of Holland, residing at Yokohama, in the Empire of Japan, have invented certain new and useful Improvements in Houses, (for which a patent has been granted me in Great Britain, being dated September 10, 1891, No. 15,347,) of which the following is a specification.

My invention refers to the construction of houses as hereinafter described, which enable people to live hygienically both in the coldest climates and in the hottest countries, and my said invention consists of a building, the walls thereof being composed of boxes of particular construction as hereinafter described, having the vertical sides of the same formed of glass and transparent, and a transparent roof or ceiling similarly constructed, the space within or between the double transparent walls and roof being filled with water containing alumen in solution. In buildings thus constructed daylight penetrates to every part of the interior of the dwelling, while the alumen solution contained by and within the thickness of the walls enables an always equal temperature to be maintained within the house, a temperature in fact equal to that of the air introduced. It will thus be evident that in hot climates the introduction of cool air is preferable, while in cold climates or cold seasons the introduction of warmed air is desirable. Means should therefore be provided for the supply of air at suitable temperatures, and with this object I shall hereinafter describe means for ventilation and warming which I have found to answer the purpose, when used in combination with such a constructed dwelling, although I do not lay especial claim to such ventilating and warming devices except as when fitted in houses constructed according to my invention.

In order that my invention may be readily understood, I will now fully describe the same with reference to the accompanying drawings which show by way of example so much of a house and details thereof constructed according to my invention as will be necessary to explain the construction and arrangement of the same.

Figure 2:
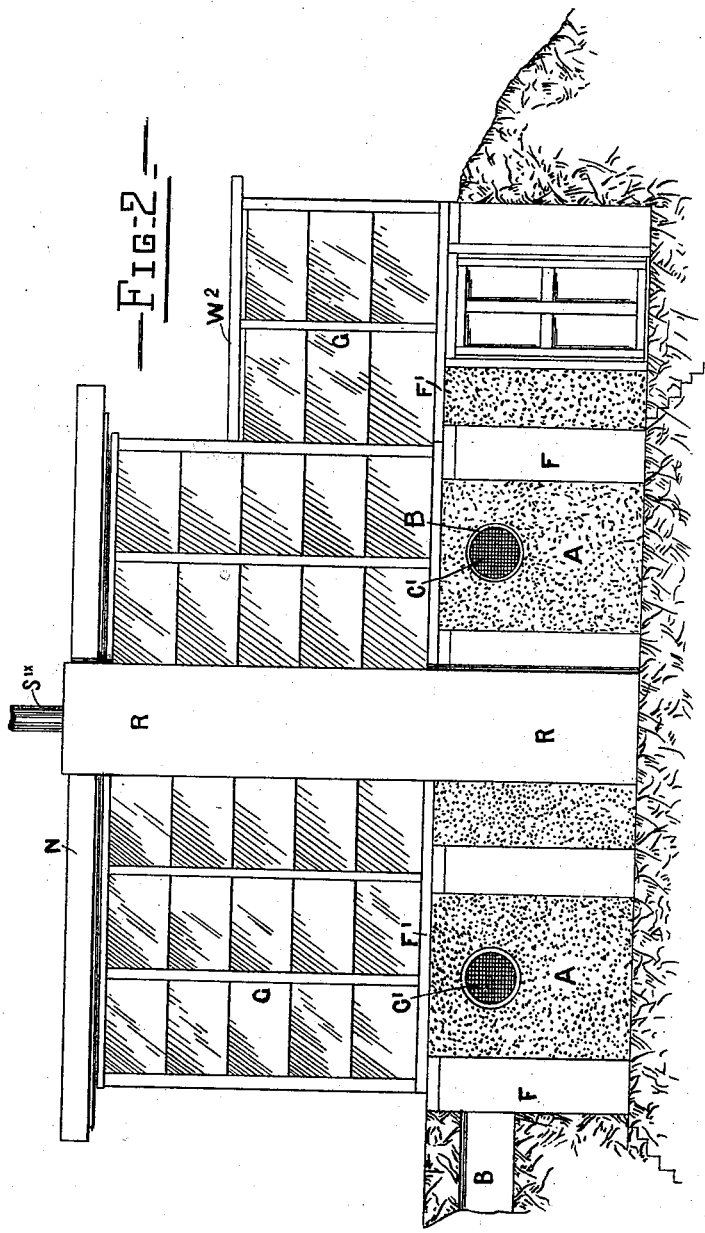
Figure 3:
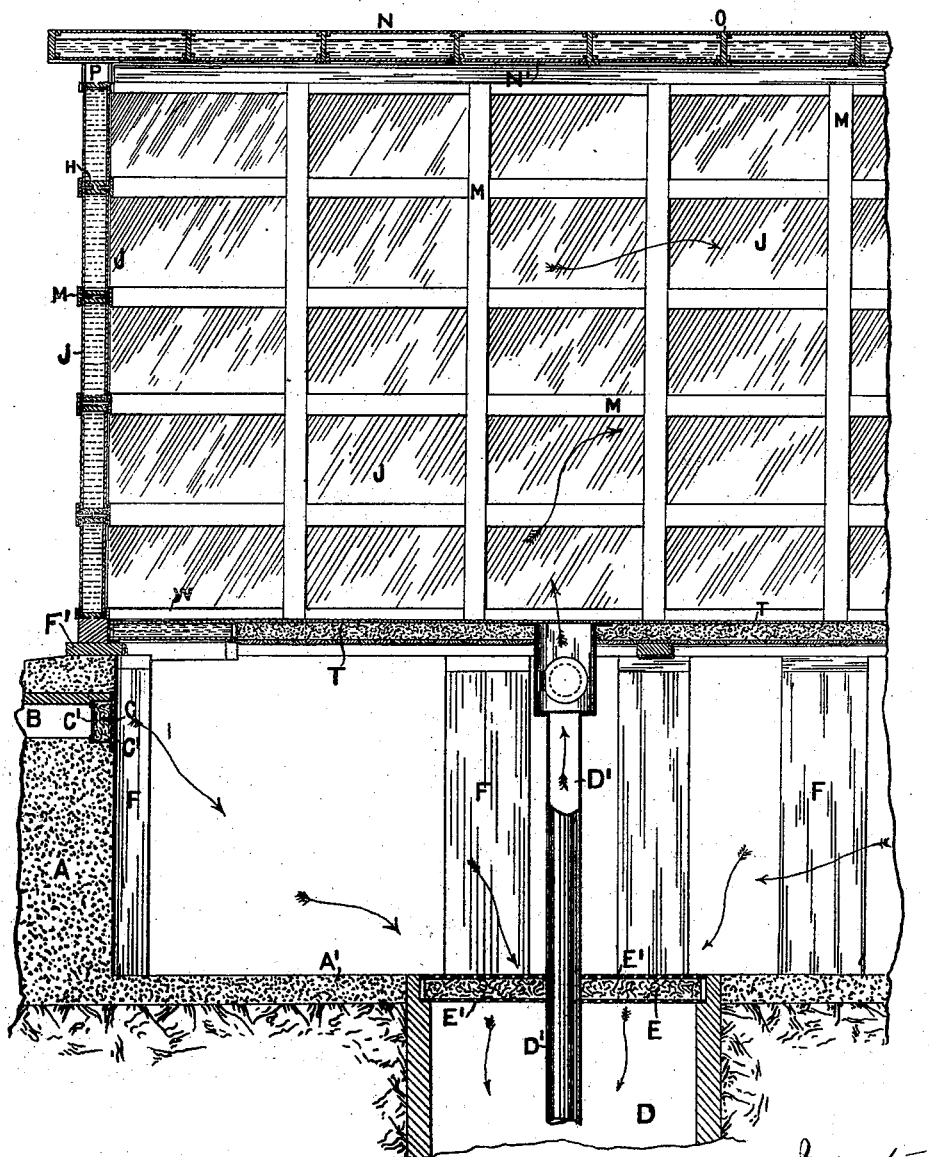
Figure 4:
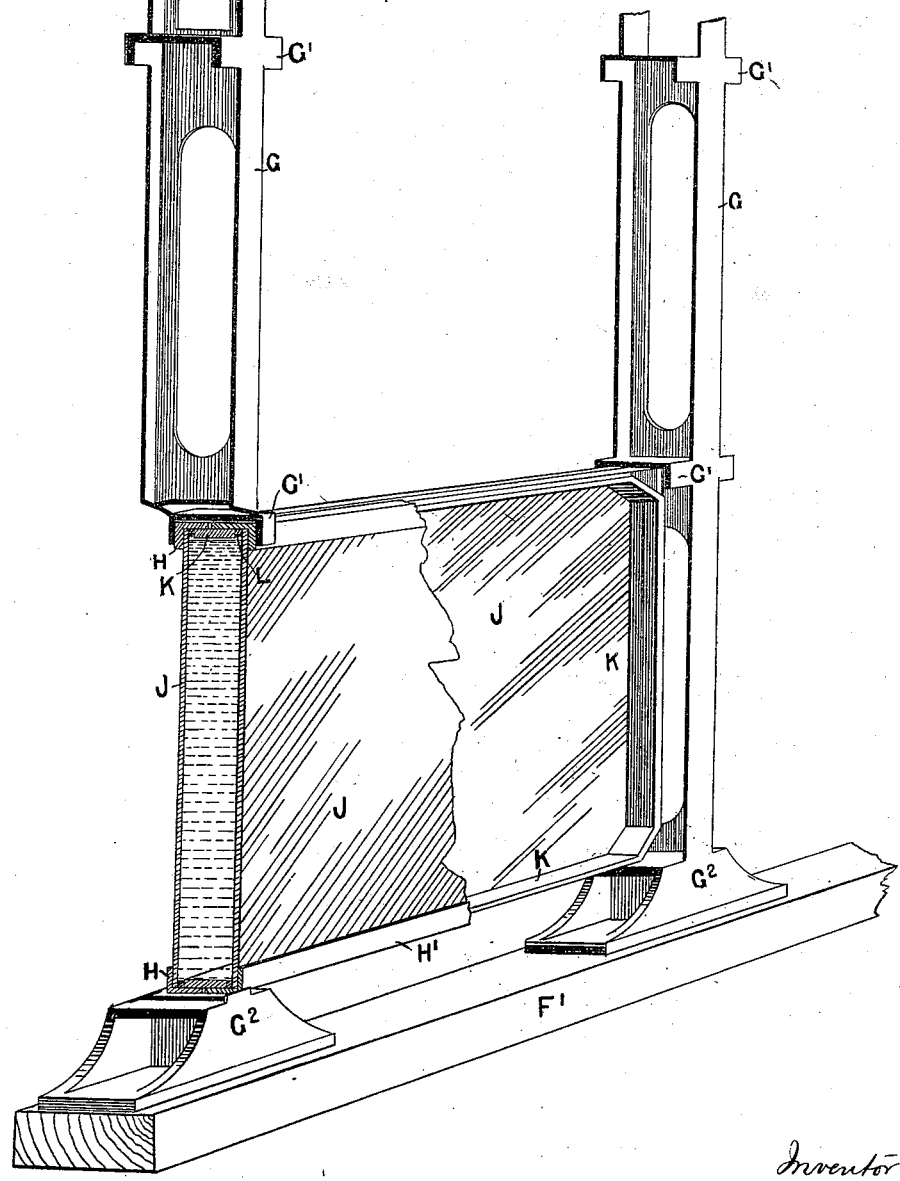

Figure 1 is a plan, portions of the flooring, &c., being removed. Fig. 2 is an end elevation of Fig. 1. Fig. 3 is a vertical cross section about the line $x\,y$ of Fig. 1, and drawn to a somewhat larger scale than the latter figure. Figs. 4 to 11 are views appertaining to the construction and arrangement hereinafter referred to.

Similar letters of reference refer to like parts in the several figures.

According to my invention I construct the building with a basement and an upper story, the said basement being situated under ground or inclosed by thick walls A.

Upon the pillars F located within the basement and upon beams F' supported thereon are standards G preferably of metal between which the walls extend, and according to my invention I make these walls double and of plate glass so arranged that between the two thicknesses of glass there remains a space. As this space is intended to contain water or a solution of a salt, as hereinafter described, the glass panes should be connected and arranged in such a way as to form water-tight closed boxes or cases, the said walls of the upper story or stories being composed of a number of such boxes or cases.

The construction of a box or case is shown at Figs. 4 to 7, Fig. 4 being a sectional perspective view showing two supporting metal uprights or columns G, and one of the boxes or cases supported thereby. Fig. 5 is a perspective view of one of the boxes separated. Fig. 6 is a vertical transverse section on the line $x'\,y'$ of Fig. 5, and Fig. 7 shows the box with the frame and glass of one side removed, to show the interior.

Fig. 8 shows so much of two of the boxes or cases for the roof or ceiling as is necessary to explain the construction of the same.

Each box or case for the walls, see Figs. 5 to 7, is composed of two similar cast iron or other metal frames H and H', and on these frames the glass panes J J are laid and fixed thereto by suitable cement applied in a fluid condition so that it fills up all the gaps and spaces left by any unevenness of the glass J J or the metal frames H H'. A wood or other suitable frame K provided on both edges with a strip of rubber (caoutchouc) L L, Fig. 6, is interposed between the two metal frames H H', and bolts $H^2\,H^2$ are passed through the corners of the metal frames H H' so as to pass outside clear of the frame K, as clearly shown at Fig. 7; by these bolts the frames H H' are held together pressing against the frame K and thus pressing the elastic strips against the glass panes J J in such a manner as to insure an air and water-tight joint.

The frame K should be prepared by being painted and varnished or otherwise, so that no fluid may be absorbed by it. The water or solution is let in through an opening $H^3$ on the top of the metal frames and another opening $H^4$ is provided for the escape of the air; both of the said openings $H^3 H^4$ are closed by, for example, a wood plug, after the filling. The boxes so formed rest on steps G' formed on the cast iron or steel uprights or columns G, shown at Fig. 4, which latter are formed with a foot $G^2$ by means of which they are secured by screws or the like to the beams F' resting directly on the aforesaid stone pillars F.

I do not confine myself to the precise arrangement of the uprights shown, such being samples of construction, the design of which must be varied to suit the style of architecture, and the details of the said columns may be varied to suit requirements; thus, one of the side flanges thereof may be made removable, so that the boxes or cases may be readily removed for repair, or be placed in position without disturbing those adjacent, and other constructional parts may be varied somewhat to suit requirements and according to circumstances.

The metal uprights as well as the spaces between the boxes or cases should be covered with felt and over this, with thin wooden planks, such as M, Fig. 3, in order to prevent the too rapid conduction of heat, and these wooden coverings are provided both outside as well as inside the house in such a way that the metallic framing is not exposed. The ceiling N which in a one-storied house forms at the same time the roof, is made in a similar way; that is to say, of double glass panes N' N' containing the solution between them, and the construction may be as shown at Fig. 8. As the boxes in this case lie horizontally, the effective depth of the fluid in them is now much less and considerably reduces the pressure of the liquid on the joints, so that the water-tight fitting of the glass panes is rendered thereby much easier; I may therefore fix the panes N' N' between two wooden frames or beams, such as O, which span the roof or ceiling, and I may form the joints with elastic strips somewhat as previously described. Fig. 8 shows such an arrangement where a flange O' is formed or provided on the horizontal beam O, and receives the lower glass N' above which a strip, say of wood lined with india rubber or caoutchouc is screwed, so as to press into the glass. The upper glass pane N' may be of ordinary window glass and laid or rested upon wooden supports fixed to the beam.

The water-tight spaces inclosed between the glass panes of the boxes of the walls and of the ceiling or roof I fill with a solution of kali alumen or ammonia alumen, which has the well known property of absorbing radiant heat. Supposing a temperature of the outside air in the tropical climates to be between 140° and 150° Fahrenheit or about 60° Celsius, I may to one hundred parts of water employ about fifty parts of alumen, that is half the weight of the water, or in some cases if found preferable I may use other salts, for instance sulphate of soda and others. The tiers of glass boxes or cases placed one above another to form the walls of the dwelling and supported on the steps of the metal column, see Fig. 4, do not reach up to the glass cases forming the ceiling, the columns being somewhat higher, a space is thus left between the top of the walls and the ceiling, and this I close by a woodwork molding. It is through this space and molding that heated air may be passed, from a heating apparatus into the chamber, and the air may also be caused to escape from the interior thereof through openings P, Figs. 3, 10 and 11, in the aforesaid molding. The various openings may each of them be closed if desired for the regulation of the influx or efflux of the warm air.

The floor T of the dwelling place proper should be made of wood of double thickness, the space between being filled with sawdust as shown at Figs. 3 and 9, while in the corners glass boxes W, Figs. 1 and 3, similar to those of the walls, are provided to admit light to the basement.

The entrance to the dwelling place is made by carrying several of the boxes such as compose the walls, in a hinged iron frame, as indicated at W', Fig. 1, this opening from an entrance chamber $W^2$ closed by another ordinary door $W^3$, or in some cases entrance may be had by steps and an opening in the floor of the dwelling closed by a trap door, although this latter arrangement is not shown in the accompanying drawings; in both arrangements the doors should close air-tight.

In houses constructed as described, the interior being closed to the outer atmosphere, it is of course necessary to provide air, preferably cool air, or air and warmth according to circumstances, for the supply of the interior, and I will now describe means for effecting this object. The basement or "go-down" beneath the dwelling place, (and into which basement the sunlight does not enter) is formed with openings B B extending through from the interior to the open air; these openings B B are formed for the entrance of air, the latter being filtered as it enters, through cotton C, Fig. 3, with which the air apertures are packed, the said cotton being retained in position by gratings C' C' on either side. In the floor A' of the basement there is a well D covered with a double iron grating E' E' between which cotton E is placed, and a tube D' passes from the interior of the well D through the grating and upward to supply air of as constant a temperature as possible for the upper story of the house, the air being supplied to the well D from the atmosphere through the apertures B and the basement of the structure, all as hereinafter described. The basement may serve as a store room or "go-down" and where possible the well D may serve as a water supply.

Adjoining the house I provide a structure to contain the heating apparatus, which structure may be situated close to or entirely free from the house, and say to the south-west thereof. The heating structure consists of a building formed by double walls constructed as before described; that is to say, of double glass cases for containing liquid, excepting that in cold countries other materials than glass may be employed, and the walls may be solid and not contain liquid, and this structure may assume somewhat the form of a tower indicated by the letter R in the drawings, see Figs. 1, 2, 9, 10 and 11. Within this structure a stove S, Figs. 9, 10 and 11, is placed, an iron chimney S'$^x$ conveying the smoke through the roof of the heating tower R which latter is otherwise perfectly closed. The air within the tower R and around the stove becoming warmed, is conducted through suitable passages under the roof and passes through the aforesaid spaces P in the wooden molding aforesaid into the dwelling, while the tower R is supplied with fresh air by a separate pipe D$^2$ from the well, as at Fig. 9, or by a branch D$^2$, Figs. 1, 10 and 11, of the pipe D' before mentioned coming from the basement or well D in same, this entering at the floor of the tower R, Figs. 10 and 11, near the stove S but not communicating with same. The air in the tower R cannot communicate in any way with the interior of the stove. The air to serve for the combustion of the fuel in the stove S, passes through a tube S' from the interior of the dwelling having served there for the respiration of the inhabitants, the tube S' passing through the floor T of the dwelling place. The cylindrical portion of the stove may be continued downward to the basement, as is shown at Figs. 10 and 11, where the ashes may be removed through a door S$^2$ usually closed, or the stove casing may be continued partially into the basement, as at Fig. 9, and be provided with a movable bottom as at S$^2$ in the latter figure. The stove is supplied with fuel from above through a funnel feeding device, the position of which is indicated at U, Fig. 10, and this should be provided with a balanced valve for closing the same when not in use.

The double walls of the tower R may in hot or moderate climates be filled with water or a solution of iodine, and in such circumstances the chimney may be coated outside with carbon to absorb heat, and thus keep up air circulation, or the stove may in warm climates be replaced by a simple iron tube which may be coated outside with a layer of carbon and the heat of the sun warms the air inside the iron tube which air will rise and must then necessarily be replaced by the air from the room. The carbon coating of the tube, when such is employed, absorbs heat and will give this off during the night continuing to cause thereby the circulation of air. When the weather is cold and the stove S is in action, air passes to the stove from the upper room by the tube S' and the upper room or dwelling place is supplied from the tower R, which obtains filtered air by the tube D$^2$ from the basement or well D. The diagram Fig. 10 clearly shows the direction of the air currents under the latter conditions by means of the arrows therein shown. In warm weather the heat of the sun acting on the iron chimney draws air through the stove from the dwelling, or the stove may be put in action, as is shown at diagram 11 with the same effect; the stove then receives its supply of air from the pipe S' aforesaid, air being drawn into the dwelling place through the tube D' from the well D, wherein as is well known the temperature is nearly constant. In the latter case the apertures P at the upper part of the dwelling place are closed as also is the tube D$^2$, while the opening of the tube D' in the floor T which was previously closed, is now opened; the well D as aforesaid receives its supply of air through apertures B and filtering partitions C C', E E', the directions of the currents being shown by the arrows Fig. 11.

In some cases where desired, the mechanical action of fans or like apparatus may be employed to promote circulation of air.

The solution of alumen does not readily freeze, but where this is likely, as in arctic regions, I may surround the house with a glass casing V, partly shown in Fig. 9, leaving a space which may contain warmed air supplid from the heating tower or vapor of water or ethereal oils.

I claim as my invention—

1. A building having the walls built up of water-tight boxes each filled with a solution of alumen, the exterior and interior vertical sides of the boxes being formed of glass, rendering the walls translucent, columns G by which the tiers of superposed boxes are supported, horizontal beams O carried on the said columns G for supporting the roof or ceiling, a translucent ceiling or roof composed of double glass panes N' N' containing alumen solution between the same, a double wood flooring T having an inter-space filled with sawdust or non heat conducting substance, and walls A and pillars F for supporting the structure, whereby a building is produced into which daylight penetrates to every part, while the walls, roof and flooring are practically impermeable to heat or cold, as set forth.

2. Boxes or cases for building translucent walls of dwellings, each composed of two metal frames H H', two plate glass panes J J fixed into the frames H H', a wood or other frame K provided on each edge with rubber packing L L for interposition between the metal frames H H', bolts H² passing through both frames H H' to hold the same together and cause the rubber packing L L to press onto the glass panes and preserve a water-tight joint, and apertures H³ H⁴ for filling the box with a solution of alumen, as set forth.

3. The combination in a building, of walls and roof built up of glass-sided boxes or cases filled with alumen in solution, the said walls and roof being translucent, a double floor T with inter-space therein filled with non heat conducting material, and an inclosed or underground basement beneath the floor T; apertures B in the basement walls with filtering medium C for admitting air to the basement, a well D in the floor of the basement, filtering cotton packed grating E' E' for filtering air admitted to the well from the basement, and a pipe D' from the well into the upper dwelling place to supply air of an equable temperature from the well to the dwelling place, as set forth.

4. The combination in a building having the walls and roof built up of glass-sided boxes or cases filled with alumen solution, the said walls and roof being translucent, of a double floor T, the inter-space therein packed with non heat conducting material, and an inclosed or underground basement beneath the floor T, and basement walls with apertures B and filtering medium C for admitting air to the basement, a well D in the floor of the basement, filtering grating E E' for filtering air admitted to the well from the basement, a stove S in out building R, pipe S' to conduct used air from the dwelling place to supply combustion, and pipes D' D² to conduct air from the well, to be heated by passing around the stove, and passages P by which fresh air enters the said dwelling place, as set forth.

5. The combination in a building having walls and roof, of boxes introduced in the walls and having glass sides and containing a solution of alumen for admitting light and intercepting heat rays, substantially as specified.

W. VAN DER HEYDEN.

Witnesses:
  R. A. MEES,
  T. ISHUIRE.